No. 650,423. Patented May 29, 1900.
G. H. F. SCHRADER.
TIRE VALVE ATTACHER.
(Application filed Nov. 13, 1895.)
(No Model.)
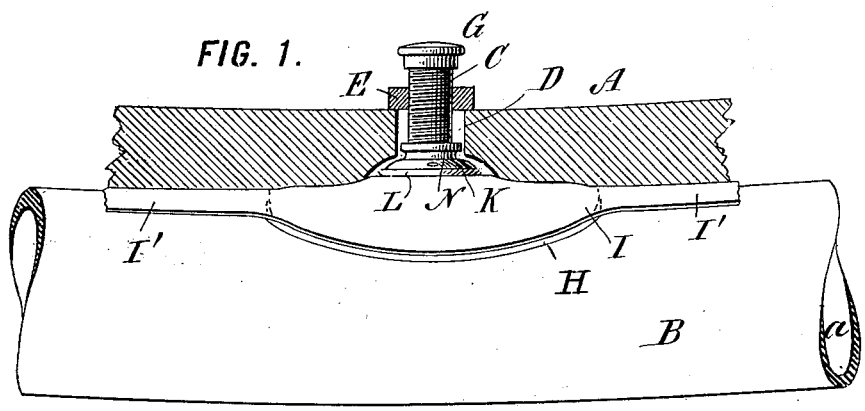
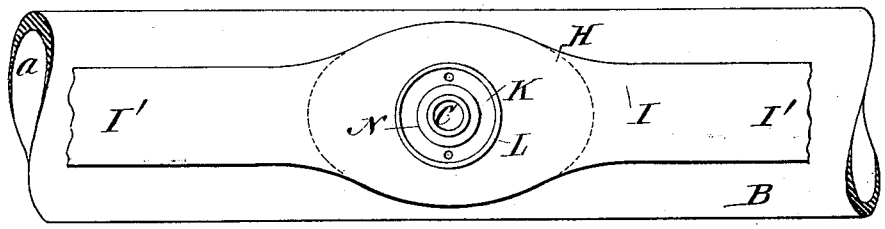
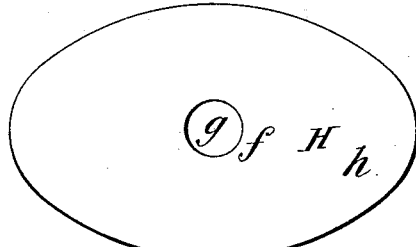
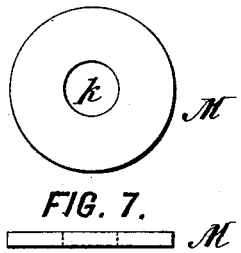
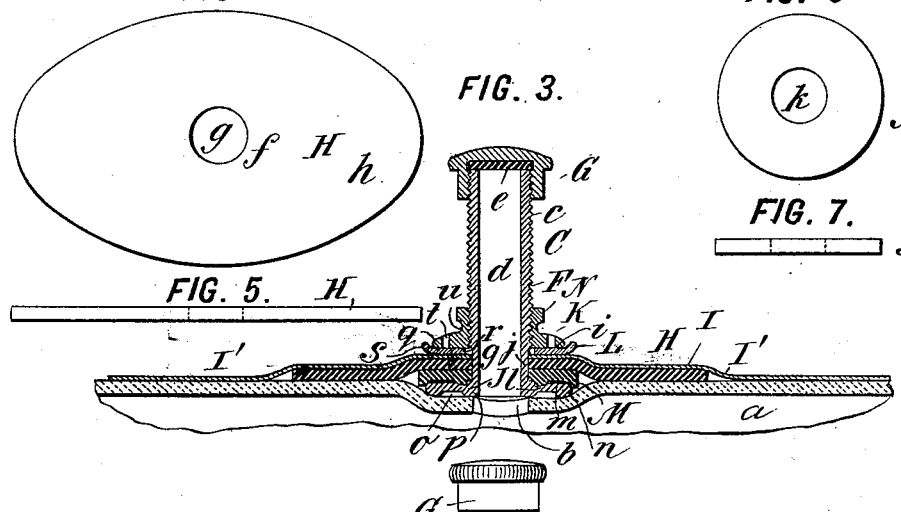
WITNESSES:
Fred White
Thomas F. Wallace
INVENTOR:
George H. F. Schrader,
By his Attorneys,

UNITED STATES PATENT OFFICE.

GEORGE H. F. SCHRADER, OF NEW YORK, N. Y.

TIRE-VALVE ATTACHER.

SPECIFICATION forming part of Letters Patent No. 650,423, dated May 29, 1900.

Application filed November 13, 1895. Serial No. 568,780. (No model.)

*To all whom it may concern:*

Be it known that I, GEORGE H. F. SCHRADER, a citizen of the United States, residing in the city, county, and State of New York, have invented certain new and useful Improvements in Tire-Valve Attachers, of which the following is a specification.

This invention relates to valves for pneumatic tires and the like, and aims to provide an improved article of manufacture by means of which tire-valves can readily be attached to their tires.

Heretofore in pneumatic tires it has been customary to provide a radial rubber tube or cot projecting through the valve-socket in the felly from the tire to the inner side and to fasten a pneumatic valve in this cot by a wire or other winding around the cot for pressing it against the exterior of the casing of the valve. This winding has caused impairment of the cot, and experience has proved that in many instances leakage between the cot and valve-casing occurs. The main difficulty to be overcome in such constructions is the danger that the cot will be severed near the tire by the creeping of the latter around the felly, which it is found in practice almost impossible to avoid. Immediately any leakage occurs or the cot is severed the utility of the tire is either destroyed or so impaired as to render its removal and repair necessary.

My present invention aims to provide means whereby creeping of the tire shall be prevented to any material extent and such creeping shall be impotent to impair the valve and connections, an improved means for attaching or applying the valve to the tire, and an improved article comprising a valve and attacher which can be readily applied by any person to the tire.

To this end in carrying out the preferred form of my present improvements I provide a flexible disk-like attacher, substantially flat, adapted to be cemented to the tire and having a perforation near its center adapted to receive a pneumatic valve, and I construct a combined valve and attacher, the valve being rigidly coupled to the middle portion of the attacher and adapted to pass through the valve-socket of the felly, and the attacher adapted to be cemented around the shoe of the valve to the tire, with the valve-conduit substantially in coincidence with the inlet to the tire, and I provide certain other features of improvement which will be hereinafter more fully set forth.

In the accompanying drawings, which illustrate the preferred embodiment of my invention, Figure 1 is a fragmentary side elevation of a bicycle-tire provided with my improvements, a fragment of the felly being shown in longitudinal section. Fig. 2 is a fragmentary plan view of a tire and my valve and attacher. Fig. 3 is a fragmentary axial section of the valve attachment applied to the tire. Fig. 4 is a plan view, and Fig. 5 an edge view, of the attacher-disk. Fig. 6 is a plan view, and Fig. 7 an edge view, of the packing-disk; and Fig. 8 is a fragmentary side elevation of the improved attachment, comprising the valve and attacher, before application to a tire.

Referring to the drawings, let A indicate the felly of a wheel; B, a pneumatic tire carried on the outer face of the felly; C, a pneumatic valve for the tire; D, a valve-socket in the felly through which the valve passes, and E a nut screwing on the inner end of the valve and against the inner face of the felly for holding the valve in position.

The felly may be of any suitable construction, the tire may be any suitable pneumatic or like tire, that shown having a single tube $a$, having an inlet-hole $b$ opposite the valve, and the valve may be any usual or suitable pneumatic or other valve controlling egress from the interior of the tire. The valve shown consists of a tubular shell F, having an external screw-thread $c$ traversed internally by a conduit $d$ and closed by a cap G, screwing on the end of the casing, and having a packing-washer $e$ clamped over and closing the conduit $d$.

According to my invention an attacher H is provided for the valve. In its preferred form this is a disk, preferably of oblong or oval outline and of flexible material, having a central part $f$, adapted for attachment to the valve, an aperture $g$, adapted to coincide with the conduit through the valve, and an outer part $h$, adapted to fit and adhere to the outer face of the tire. This is preferably a pure-rubber disk normally flat and of uniform thickness and adapted to be cemented to the tire and make a leak-tight connection therewith all around its central part $f$, which latter part is adapted to receive and make a leak-tight connection with the valve.

By preference the attacher H is reinforced by a textile or other reinforcing layer I, which preferably is securely applied to the rear face of the disk, tightly adhering thereto, and has extensions I' beyond the ends of the disk, extending longitudinally of the tire throughout any desired length and adapted to be cemented or otherwise immovably connected thereto.

According to another feature of improvement I provide as a new article of manufacture a combined valve and attacher adapted to be applied to a tire by any person and simply requiring for such application the proper adhesion or cementing of the attacher to the outer face of the tire. The valve and attacher may be united in any suitable or desired manner; but I prefer to employ a separable connection between them, and especially to use the connection shown, wherein the valve is provided with any suitable character of projecting annular shoe or flange J on its end, which passes to the inner side of the disk H, being sprung through the hole $g$ therethrough, while a nut K, having a corresponding wide clamping-face $i$, screws on the valve-casing toward the disk H, clamping the latter in a leak-tight manner between itself and the shoe J. An antifriction thin metal or other suitable washer L is preferably interposed between the nut K and disk H, and a compression packing-washer M is preferably interposed between the shoe J and disk H, so that impairment of the latter is prevented and its distortion by rotation of the nut is avoided. The nut is preferably set up so tight as to make a permanent closed joint between the attacher and valve during all normal conditions and can only be released by using considerable force and a wrench. The compression of the disk between the shoe and nut will not materially impair it, although it may give the disk a slight convexity on its tire side, which is not objectionable.

Preferably the valve-shell is constructed with a reduced smooth cylindrical neck $j$, extending from the shoe J to above the working face of the nut K, and the washer M and disk H are sprung over and elastically embrace this neck, the hole $g$ of the disk and the hole $k$ of the washer being normally of the same or a smaller diameter than that of the neck. The shoe J is best formed on its upper face with an inner groove $l$, a roughened outer ridge $m$, and a rounded edge or bead $n$ and on its lower face with a groove $o$, extending from the bead inwardly, and a ridge $p$, extending from the groove to the inner end of its conduit $e$. The groove $l$ and ridge $m$ engage the washer M. The bead $n$ and portion $p$ bear loosely on and are unattached to the adjacent wall of the tire. Their shape and the disposition of the groove between them insure that an air-passage shall exist between the tire-inlet $b$ and the valve-conduit $d$, even if in applying the attachment to the tire the valve should be imperfectly located. The edge $q$ of the nut K is preferably slightly rounded, and the washer L, which has a central hole $r$ large enough to permit its being passed over the thread $c$, has an upturned or rounded outer edge $s$, preventing injury to the top face of the attacher. The nut is shown as provided with wrench-holes $t$; but any other provisions for turning it may be substituted.

According to another feature of improvement the valve contacts with the felly in case of creeping and opposes its metallic exterior to the walls of the socket through the felly to prevent such creeping instead of opposing any part of the tire or attacher to such walls. Any construction by which the metal instead of the rubber shall perform this function may be employed; but I prefer to utilize a portion of the nut K for this purpose. To this end I provide the nut with a portion N, preferably a cylindrical inwardly-projecting head, between which and the body of the nut there is a groove $u$, which head substantially fits the valve-socket D in the felly and engages the walls of the socket, thus preventing movement when there is any tendency to creep. The force and the wear in overcoming this tendency is all applied to the head N, by which it is transmitted in part to the fastening-nut E at the inner side of the tire and in part to a large circular inner portion of the attacher H in such manner that the latter will not be impaired by the strain and can resist it.

In practice the attachment comprising the valve and attacher combined will be sold as an article of commerce, and the attacher can be caused to adhere to the tire by an ordinary cementing operation, which can be done by any person. Should it ever become necessary to remove the valve, the latter can be loosened from and then sprung through the attacher and a new valve applied in its place. The attaching-disk will also be used by those who wish to apply other valves to it or to substitute a new disk for a worn one.

It will be seen that my invention provides improvements which can be readily availed of and which greatly simplify the application of tire-valves to the tires and remove the chief danger heretofore existing in the use of such valves. The danger of severing the cot heretofore employed has been so great that various expedients for strengthening it have been resorted to—such as, for example, placing longitudinal resisting threads or cords along its tubular portion and near its face. These efforts, while involving much trouble and expense, have only served to somewhat prolong the life of the cot, none of them being sufficient to prevent its eventual impairment.

My improvement completely removes the danger to the valve connection heretofore incident to the creeping of the tire.

It will be understood that the invention is not limited to the particular form, combination, or construction shown, but that it can be availed of according to any modifications desired without departing from the spirit of the invention.

What I claim is—

1. An attacher for tire-valves, comprising a rubber sheet H, and a textile reinforce I fixedly carried on the outer side thereof, and having extensions I' extending beyond said part H, said sheet H and reinforce I both adapted to be connected to the outer face of a tire to connect a valve thereto.

2. The combination with a pneumatic tire having a hole, of a valve, having an outer small screw-threaded body and a wide flange at its inner end, bearing against the outer face of said tire opposite said hole, an attacher having a flexible portion surrounding the valve at the outer side of said flange, and having a face surrounding the latter and cemented to the tire, and a nut screwing on said body against the outer side of said attacher and clamping the latter between itself and said flange with an air-tight joint, said attacher uncemented to said tire opposite the inner end of the valve, and such end freely bearing against the outer face of the tire.

3. As a new article of manufacture, an article comprising a flexible attaching-disk and a valve extending entirely through said disk and separably connected thereto by a leak-tight connection, said valve engaging the top and bottom faces of the middle of the disk, and having an inner end adapted to bear against the outer face of a tire, and said disk having an annular bottom portion beyond said valve of relatively-great projection beyond said flange, and adapted to be cemented around the latter to a tire.

4. As a new article of manufacture, a tire-valve having a small body adapted to fit in the valve-socket of a wheel-felly, and having a large annular metal part opposed to the walls of said socket, and relatively-small annular portions above and below such part, and an attacher consisting of a flexible disk, having an annular outer tire part adapted to be cemented to a tire, and an inner valve part connected to said valve by a leak-tight joint beyond the part of the latter opposed to the walls of said socket, said valve passing entirely through said attacher, and having a wide flange at the inner side of and clamped to the latter, and adapted to seat directly and freely against the outer face of the tire when said attacher is cemented thereto.

5. For pneumatic tires and the like, a felly A, a tire having an air-hole, B, a screw-threaded valve C traversing the felly, a disk H surrounding the valve and cemented around said valve and hole to the outer face of the tire, a shoe J carried by the valve at the inner side of the disk, and bearing freely against the outer face of said tire opposite said hole, a nut K screwing on the valve against the disk and clamping the latter between the nut and shoe, and a nut E screwing on the valve against the felly and holding it and the tire in position on the latter, all combined and arranged substantially as and for the purpose set forth.

6. The combination with a wheel-felly A, having a valve-socket D, a pneumatic tire carried by said felly and having an air-hole opposite said socket, and a valve for said tire, fitting said socket, having a screw-threaded body and a shoe J at its lower end, of an attacher-disk H surrounding said valve above said shoe and cemented to said tire around the valve, and a nut screwing on said valve against said disk and having a wide annular surface at its bottom clamping the latter to the valve, said valve held in said socket and having a smooth exterior opposite said disk, and said attacher-disk transmitting the creeping strains of said tire to said valve, said valve preventing creeping of the tire, and said disk distributing the resistance of the valve to creeping strains over a large area of said tire.

7. The tire B, and valve C attached thereto, in combination with a felly A, having a valve-socket D, and a clamping-nut K screwing on said valve and having a shoulder N snugly fitting said socket, and a reinforce-attacher H adhering to said tire and clamped by said nut to said valve, whereby creeping of the tire is prevented by said shoulder.

In witness whereof I have hereunto signed my name in the presence of two subscribing witnesses.

GEORGE H. F. SCHRADER.

Witnesses:
GEORGE H. FRASER,
THOMAS F. WALLACE.